Sept. 27, 1927.

E. W. DENMAN 1,643,807

OIL CUP FOR CEILING FANS

Filed March 5, 1923

WITNESSES:
J. R. Myers
R. J. Harrison

INVENTOR
Earl W. Denman
BY
Wesley G. Carr
ATTORNEY

Patented Sept. 27, 1927.

1,643,807

UNITED STATES PATENT OFFICE.

EARL W. DENMAN, OF SWISSVALE, PENNSYLVANIA, ASSIGNOR TO WESTINGHOUSE ELECTRIC & MANUFACTURING COMPANY, A CORPORATION OF PENNSYLVANIA.

OIL CUP FOR CEILING FANS.

Application filed March 5, 1923. Serial No. 622,726.

My invention relates to vertically disposed motors for ceiling fans and other purposes, and it has particular relation to means for positively securing the lubricating container thereof in place.

Motors of the above-described class, particularly those employed in railway coaches, are subject to constant vibrations and frequent jarring, with the result that such parts thereof as are connected by screw threads, or otherwise, gradually become sufficiently so loosened as to separate and fall, sometimes with disastrous results. Motors of the class described are commonly provided with an oil cup suspended therefrom and containing sufficient oil to lubricate the moving parts for a long period of time, and such oil cups are particularly prone to become detached and fall with obvious disagreeable consequences.

It is the principal object of my present invention to provide a simple and positive means for securing the oil cup to the bearing in such manner so that it cannot become accidentally detached but can be readily manually detached for the purpose of renewing the oil or cleaning or repairing the motor.

With the above and other objects in view, my invention consists in the combinations and parts described and claimed hereinafter and illustrated in the accompanying drawing, wherein:—

Figure 1:
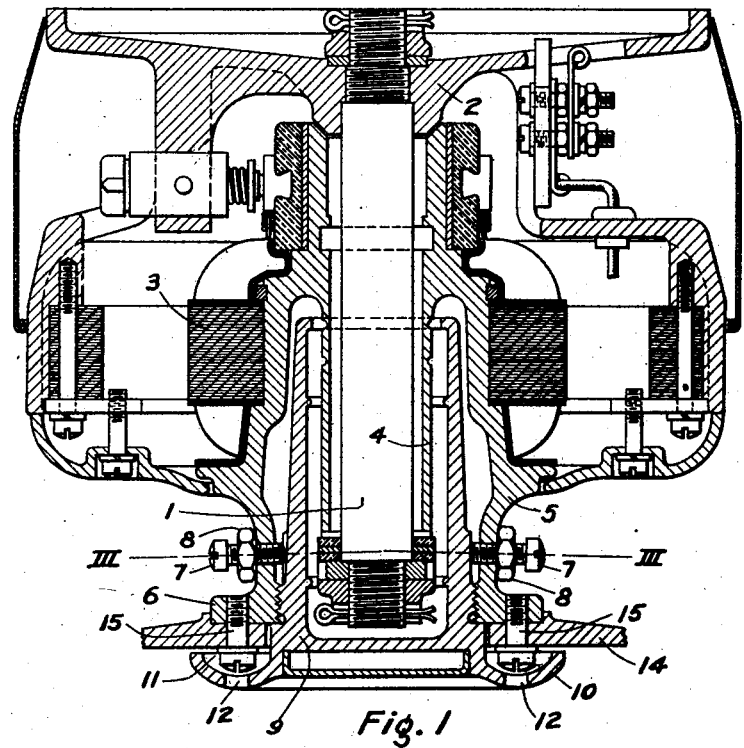
Figure 1 is a vertical side view of a motor and fan, partly in section.
Figure 2:
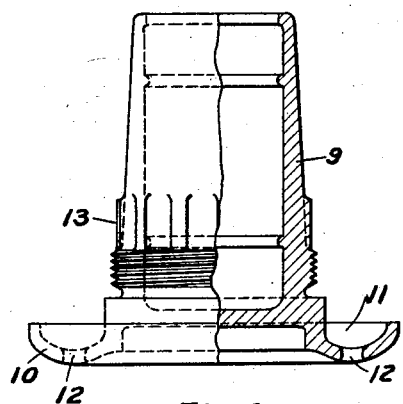
Fig. 2 is a vertical side view of the oil cup, partly in section.

In the drawing, my invention is shown as embodied in a motor having a shaft 1 which is fixed to a supporting frame 2 at its upper end, said motor also having an armature core 3 which is provided with a sleeve-like bearing portion 4 surrounding the shaft. The core 3 is further provided with an outer cylindrical portion 5 spaced from the bearing portion 4 and projecting thereover, said outer portion 5 having an annular flange 6 at its end. The outer cylindrical portion 5 is preferably, but not necessarily, provided at diametrically opposite points, with set-screws 7 extending therethrough, each set-screw carrying a lock nut 8.

An oil cup 9 is connected within the cylindrical portion 5 and over the bearing 4, preferably by screw threads, as shown. The base of the cup is provided with an outstanding flange portion 10 having an annular depression 11 and spaced openings 12 therein. The cup is further provided with a fluted or corrugated surface portion, composed of an uneven number of equally spaced, longitudinally disposed ribs 13, whereby there is provided a rib at one point and a depression at a point diametrically opposite thereto. It is not necessary that the ribs be provided all the way about the cup, but it is preferable to do so, as it provides an unlimited operating surface at points within the path of the screws 7, as will be later apparent.

In this instance, a fan-blade spider 14 is attached to the flange 6 by screws 15 before the cup 9 is in place. The openings 12 in the cup flange 10 are disposed opposite the screws and are smaller than the screw heads, whereby the screws may be readily tightened, while the flange 10 effectually prevents them coming out even though they become somewhat loosened.

When the oil cup is screwed into the cylindrical portion 5, the set screws 7 are adjusted inwardly to engage the corrugated surface of the cup, after which the lock nuts 8 are tightened up.

Figure 3:
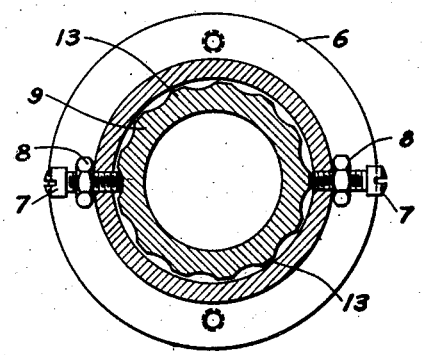
Fig. 3 is a transverse sectional view, on line III—III of Fig. 1.

When the screws are tightened, at least one of them will engage the cup between two ribs while the other may engage upon a rib of the corrugated surface portion, as shown more clearly in Fig. 3, thus preventing the cup being unscrewed through the effect or vibration or jarring, but, as apparent, permitting the cup to be removed manually by loosening the lock screws 7.

Figure 4:
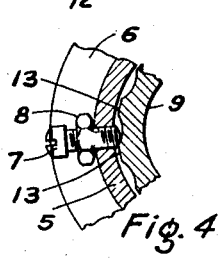
Fig. 4 is a transverse sectional view, similar to Fig. 3, of a fragmentary part thereof.

Should the screws 7 not engage the corrugated surface with one between a pair of ribs and the other upon a rib, they would both engage at the side of the ribs sufficient to prevent the cup turning, as shown in Fig. 4.

While I have shown and described a preferred embodiment of my invention, I desire that the disclosed embodiment shall be regarded as illustrative only, and that the appended claims shall be accorded the broadest construction consistent with the prior art.

I claim as my invention:

1. The combination with a pair of rotatably connected members, of a locking mechanism for preventing accidental rotation thereof, said mechanism comprising a longitudinally corrugated surface having an uneven number of corrugations on one of said members and a pair of diametrically opposite, radially directed locking elements on the other of said members.

2. The combination with a pair of rotatably connected members, of a locking mechanism for preventing accidental rotation thereof, said mechanism comprising a longitudinally corrugated surface on one of said members and a pair of spaced radially directed locking elements on the other of said members, the relative spacing of the corrugations and locking elements being such that when one locking element is in a corrugation the other is on a ridge between two adjacent corrugations.

3. The combination with a pair of members having one or more connecting elements passing through one member into engagement with the other, of a protecting flange secured to one of said members and overlying said element or elements to prevent the accidental withdrawal of the same, said flange being provided with a perforation or perforations smaller than said element or elements for providing access thereto for the purpose of tightening the same.

4. The combination with a pair of members having one or more connecting elements passing through one member into engagement with the other, of a protecting flange rotatably secured to one of said members and overlying said element or elements to prevent the accidental withdrawal of the same, said flange being provided with a perforation or perforations smaller than said element or elements for providing access thereto for the purpose of tightening the same, and means for locking said flange against rotation in such position that access may be had to said element or elements.

In testimony whereof, I have hereunto subscribed my name this 28th day of February, 1923.

EARL W. DENMAN.